United States Patent
Yadav

(10) Patent No.: US 7,752,506 B1
(45) Date of Patent: Jul. 6, 2010

(54) FIFO MEMORY ERROR CIRCUIT AND METHOD

(75) Inventor: Rishi Yadav, Nashua, NH (US)

(73) Assignee: Cypress Semiconductor Corporation, San Jose, CA (US)

( * ) Notice: Subject to any disclaimer, the term of this patent is extended or adjusted under 35 U.S.C. 154(b) by 1370 days.

(21) Appl. No.: 10/891,339

(22) Filed: Jul. 14, 2004

Related U.S. Application Data

(60) Provisional application No. 60/503,324, filed on Sep. 16, 2003.

(51) Int. Cl.
*G06F 11/00* (2006.01)

(52) U.S. Cl. .......................... 714/54; 714/42

(58) Field of Classification Search ............. 714/54, 714/42, 48
See application file for complete search history.

(56) References Cited

U.S. PATENT DOCUMENTS

| | | | | |
|---|---|---|---|---|
| 4,703,486 | A * | 10/1987 | Bemis | 714/774 |
| 5,838,895 | A * | 11/1998 | Kim et al. | 714/15 |
| 6,810,468 | B2 * | 10/2004 | Miyamoto et al. | 711/156 |
| 2004/0098654 | A1 * | 5/2004 | Cheng et al. | 714/758 |

* cited by examiner

*Primary Examiner*—Dieu-Minh Le

(57) ABSTRACT

A FIFO memory error circuit has a read pointer coupled to a FIFO memory. The read pointer has a logic high output once every FIFO memory cycle. A write pointer is coupled to the FIFO memory and has a logic high output once every FIFO memory cycle. An error detector has a first input coupled to the read pointer and a second input coupled to the write pointer.

19 Claims, 4 Drawing Sheets

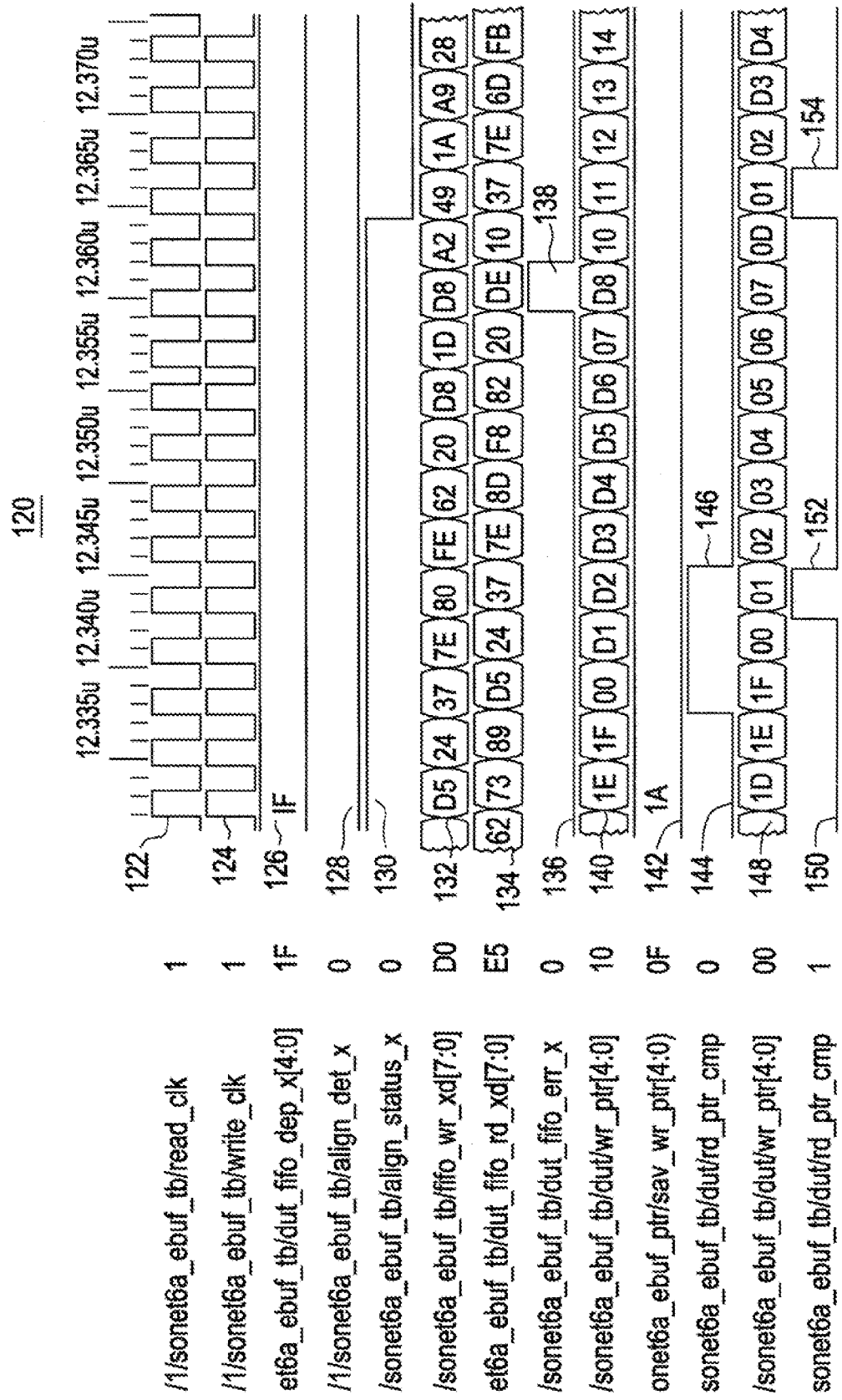

FIFO MEMORY ERROR CIRCUIT AND METHOD

RELATED APPLICATIONS

The present invention claims priority on provisional patent application Ser. No. 60/503,324, filed on Sep. 16, 2003, entitled "Reduced Logic FIFO Overrun/Underrun Detector for Data Communication Devices".

FIELD OF THE INVENTION

The present invention relates generally to the field of First-In First-Out (FIFO) memories and more particularly to a FIFO memory error circuit and method.

BACKGROUND OF THE INVENTION

FIFO (First-In First-Out) memories are commonly used in data processing and data communication applications. Some FIFO memories have error detection circuitry that is used to determine overrun and underrun condition. One conventional system for detecting these error conditions uses a gray code sequence for the read pointer and the write pointer. A gray code with a minimum Hamming distance is selected for this application. One problem with the gray code solution is that it takes a large number of bits to detect a small number of states. For instance, it takes six bits to define just thirty-two states or locations. It also requires a large number of gates to implement this solution.

Another solution has been to provide an extra status bit with each FIFO location. Whenever a write is performed at a given location, the status bit of that location and its neighbors are written with a "1" value while all others are a "0" value, or vice versa. When the read pointer read data from a location, the corresponding status bit it checked. If the status bit is read as a 0, the read data is considered valid. It the status bit is read as a 1, an error is declared. This technique requires extra circuit area to implement the status bit and writing to the status bits.

Thus there exists a need for FIFO memory error detection circuit and method that reduces the amount of logic gates required to implement the circuit.

SUMMARY OF INVENTION

A FIFO memory error circuit that over comes these and other problems has a read pointer control logic coupled to a FIFO memory. A read output is true once every read cycle of the FIFO memory. A write pointer control logic is coupled to a FIFO memory. A write output is true once every write cycle of the FIFO memory. An error detection circuit has a first input coupled to the read output and a second input is coupled to the write output. A read pulse width of the true output of the read pointer control logic is not less than two read clock cycles and a write pulse width of the true output of the write pointer control logic is at least one write clock cycle. In another embodiment, a write pulse width of the true output of the write pointer control logic is not less than two write clock cycles and a read pulse width of the true output of the read pointer control logic is at least one read clock cycle. Note that less than 3 clock cycles are required when the pointers can approach each other from either direction. If pointers can approach each other from only one specific direction, 2 clock cycles are required. When the pointer can approaching from either direction means both FIFO over-run or FIFO under-run is possible. When the pointers can approach from only one direction it means that the FIFO is susceptible to, say, only over-run condition. The error detection circuit includes an AND gate that has the first input coupled to the read output and the second input coupled to the write output. An output of the AND gate is coupled to the input of a latch. The latch is clocked by a read clock. The read output is initiated true near a start of the read cycle. The write output is initiated true near a middle of the write cycle. The read and write pointers are initiated at a maximum distance from each other. In one embodiment, the read pointer is initiated near the start of FIFO memory location count and the write pointer is initiated near the middle of FIFO memory location count.

In one embodiment, a method of determining a FIFO memory error, includes the steps of determining a read pointer count in a FIFO memory. A write pointer count in the FIFO memory is determined. Next it is determined if the read pointer count is within a clock cycle of the write pointer count. When the read pointer count is within the clock cycle of the write pointer count, an error signal is generated. Next it is determined if the read pointer count is within a read clock cycle of the write pointer count. Alternatively it may be determined if the read pointer count is within a write clock cycle of the write pointer count. A read pointer is set to a true read state for a predetermined number of read clock cycles once every FIFO memory cycle. A write pointer is set to a true write state for a predetermined number of write cycles once every FIFO memory cycle. It is determined if the true read state overlaps the true write state.

In one embodiment, a FIFO memory error circuit has a read pointer coupled to a FIFO memory. The read pointer has a logic high output once every FIFO memory cycle. A write pointer is coupled to the FIFO memory and has a logic high output once every FIFO memory cycle. An error detector has a first input coupled to the read pointer and a second input coupled to the write pointer. The read pointer has the logic high output for a predetermined number of read clock cycles. The write pointer has the logic high output for a predetermined number of write cycles. The error detector has a logic high output when the read pointer has the logic high output at the same time as the write pointer has a logic high state. The predetermined number of write clock cycles is at least one. The predetermined number of read clock cycles is at least two.

BRIEF DESCRIPTION OF THE DRAWINGS

FIG. 4 is a timing diagram of a FIFO memory and error circuit in to accordance with one embodiment of the invention.

DETAILED DESCRIPTION OF THE DRAWINGS

Figure 1:
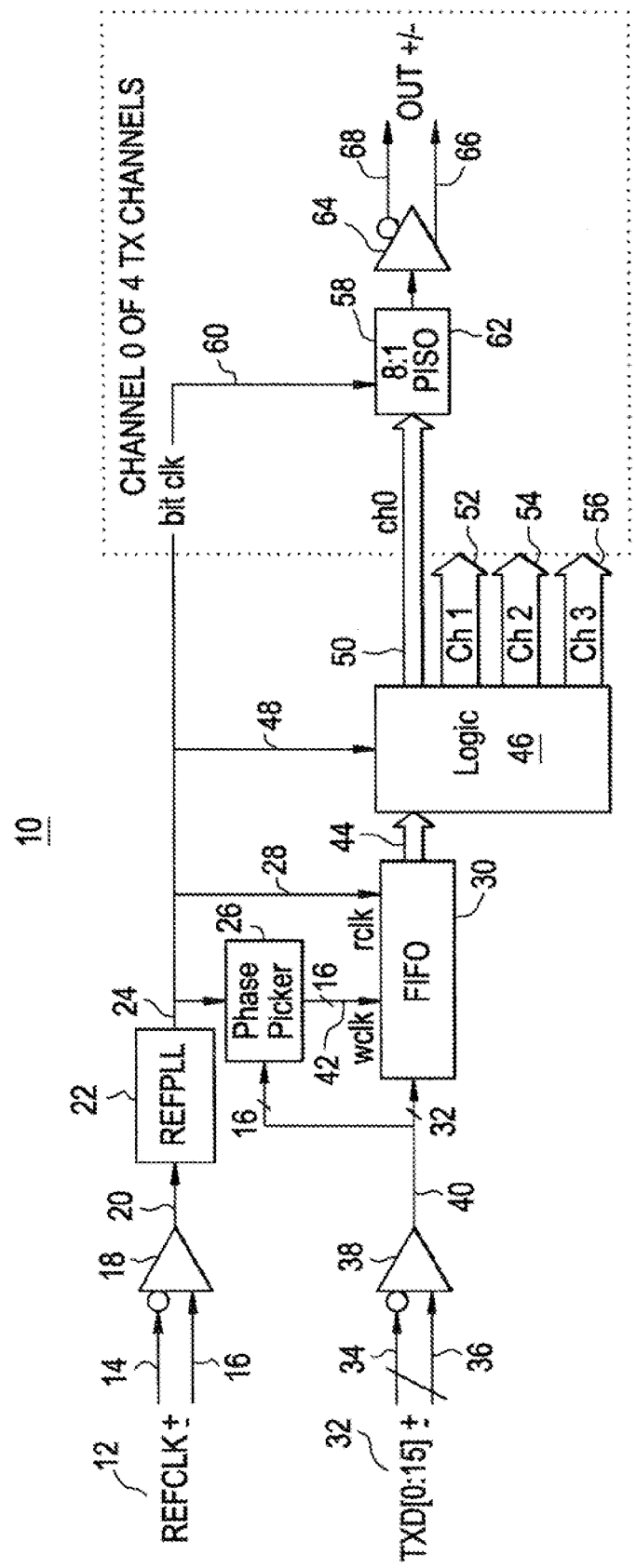
FIG. 1 is a block diagram of a FIFO memory used in a data communications application in accordance with one embodiment of the invention.

The FIFO memory error circuit described herein is simpler than previous FIFO memory error systems and requires fewer gates and less die space to implement than other FIFO memory circuits. FIG. 1 is a block diagram of a FIFO memory used in a data communications application 10 in accordance with one embodiment of the invention. The system 10 has a reference clock input (REFCLK) 12. The reference clock 12 is a differential signal with a positive signal 14 and a negative signal 16. A differential amplifier 18 or buffer has an inverting input coupled to the positive signal 14 and the non-inverting input coupled to the negative signal 16. The output 20 of the buffer 18 is coupled to a phase lock loop (REFPLL) 22. The output 24 of the phase lock loop 22 is coupled to a phase picker 26. The output 24 of the phase clook loop 24 forms the read clock 28 that is an input to the First-In First-Out (FIFO) memory 30.

In this system 10 there are sixteen transmitted data channels (TXD[0:15]) 32 of which only one is shown. The data channels 32 are differential signals with a positive signal 34 and a negative signal 36. In this example the input signals are double data rate signals where one half of the input data is received at the rising edge of the clock and the other half of the data is received at the falling edge of the clock. As a result, thirty-two (32) bits of data are received from the sixteen signals 32 per clock cycle. A differential amplifier 38 has an inverting input coupled to the positive signal 34 and a non-inverting input coupled to the negative signal 36. The output 40 of the buffer 38 is shown as thirty-two bits of data coupled to a First-In First-Out (FIFO) memory 30. The output 40 of the buffer 38 is also coupled to a phase picker 26, but only one edge of each signal 32 is needed so the phase picker only receives sixteen signals. The phase picker 26 recovers a write clock 42 for each of the sixteen data signals 32. Note that due to differences in the transmission lines among the sixteen data channels 32 the write clock can vary from channel to channel. The FIFO memory 30 as shown herein is effectively sixteen independent FIFO memories, one per data channel 32 and each FIFO memory has an error detection circuit. As a result there are sixteen independent error detection circuits are embedded in the FIFO memory 30. The First-In First-Out (FIFO) memory 30 has an output 44 coupled to a logic circuit 46. The logic circuit 46 also has as an input 48 of the read clock 24 from the reference phase lock loop 22. The logic circuit 46 is used for protocol translation in one embodiment. For instance, the protocol of the input signals 32 might be SONET and the output signals might be Ethernet. This would require translating the protocol of the signals which would require differences in how the packets of data are formed. For instance, the overhead structure is different for these two protocols. The logic circuit 46 has four channels of output 50, 52, 54, 56. Each channel contains eight signals which makes thirty two signals or bits of data per clock cycle. Channel zero 50 is shown as the input to an eight to one (8:1) Parallel-In Serial-Out (PISO) converter 58. The eight to one (8:1) Parallel-In Serial-Out (PISO) converter 58 also has a read clock input 60. The output 62 of the eight to one (8:1) Parallel-In Serial-Out (PISO) converter 58 is coupled to differential output buffer 64. The differential output buffer 64 generates a differential signal having a positive signal 66 and a negative signal 68.

In operation the input signals 32 are synchronized to a write clock and the output signals 66, 68 are synchronized to a read clock. Without the First-In First-out (FIFO) memory 46, if the read clock 24 and the write clock 42 are not exactly synchronized there will be data setup errors and erroneous data might be read. A similar problem may occur if the First-In First-out (FIFO) memory 46 has an overflow condition (data is written to the FIFO memory faster than it is read from the FIFO memory) or an underflow condition (data is read from the FIFO faster than is written to the FIFO memory).

Figure 2:
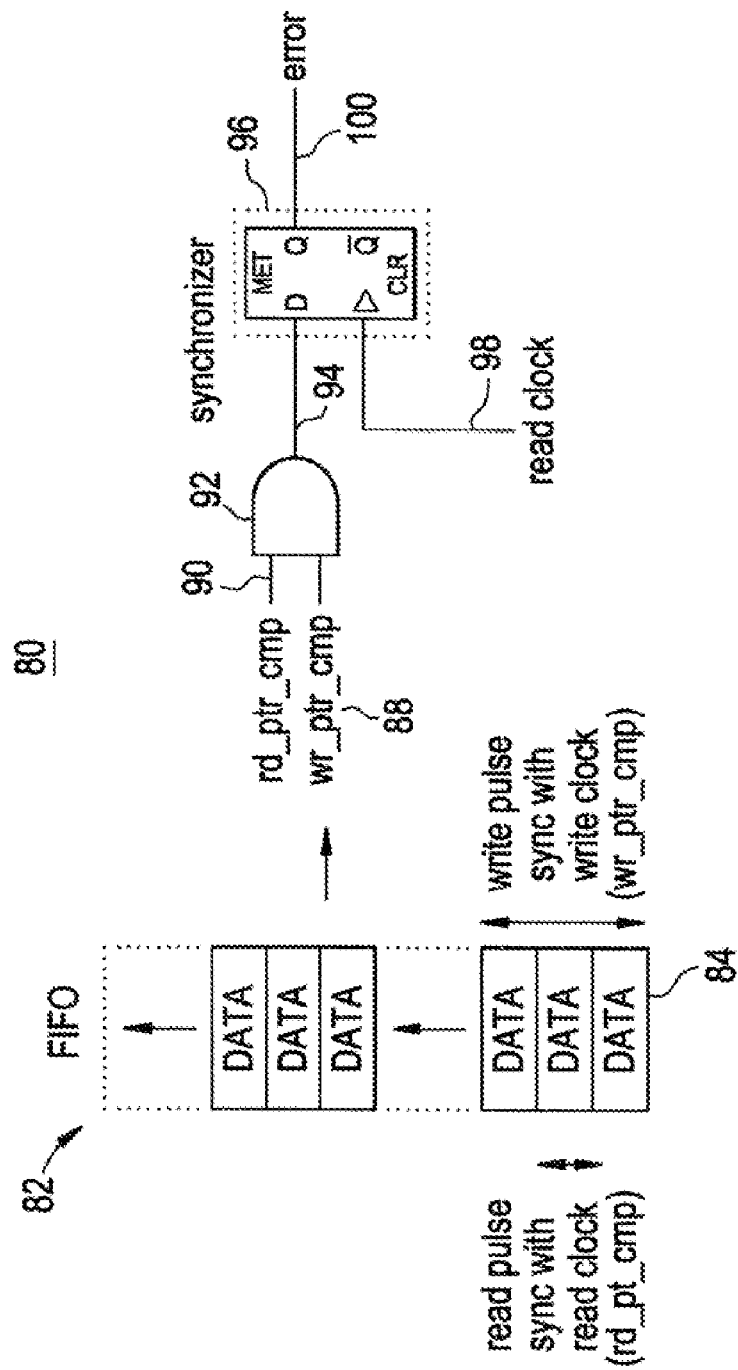
FIG. 2 is a schematic diagram of a FIFO memory and error circuit in accordance with one embodiment of the invention.

FIG. 2 is a schematic diagram of a FIFO memory and error circuit 80 in accordance with one embodiment of the invention. The system 80 has a First-in First-Out (FIFO) memory 82 with data being initially written to lower part 84 of the First-in First-Out (FIFO) memory 82 and being then being read from the First-in First-Out (FIFO) memory 82. Note that the word lower is used for designation on the drawing only and does not limit the actual implementation. This system 80 determines if the read pointer and write pointer are within one clock cycle of each other. This is accomplished in one embodiment by having the write pointer 88 set to have a logic high once every cycle of the First-in First-Out (FIFO) memory 82. So if the First-in First-Out (FIFO) memory 82 has eight cells, once every eight writes the write pointer goes to a logic high. Similarly, the read pointer 90 is set to have a logic high once every cycle of the First-in First-Out (FIFO) memory 82. The write pointer output 88 and the read pointer output 90 form the inputs to an AND gate 92. As will be apparent to those skilled in the art, the AND gate could be replaced with another logic gate by changing the output of the pointers and the invention encompasses all such variations. The output 94 of the AND gate 92 is coupled to a flip flop or latch 96. The flip flop 96 is clocked by the read clock 98. The output 100 of the flip flop 96 is an error signal 100. As a result, when the read pointer output 90 and the write pointer output 88 are both logic true or high, the output 94 of the AND gate is a logic high. The logic high is latched by the flip flop 96 and its output 100 goes high which indicates an error condition.

Figure 3:
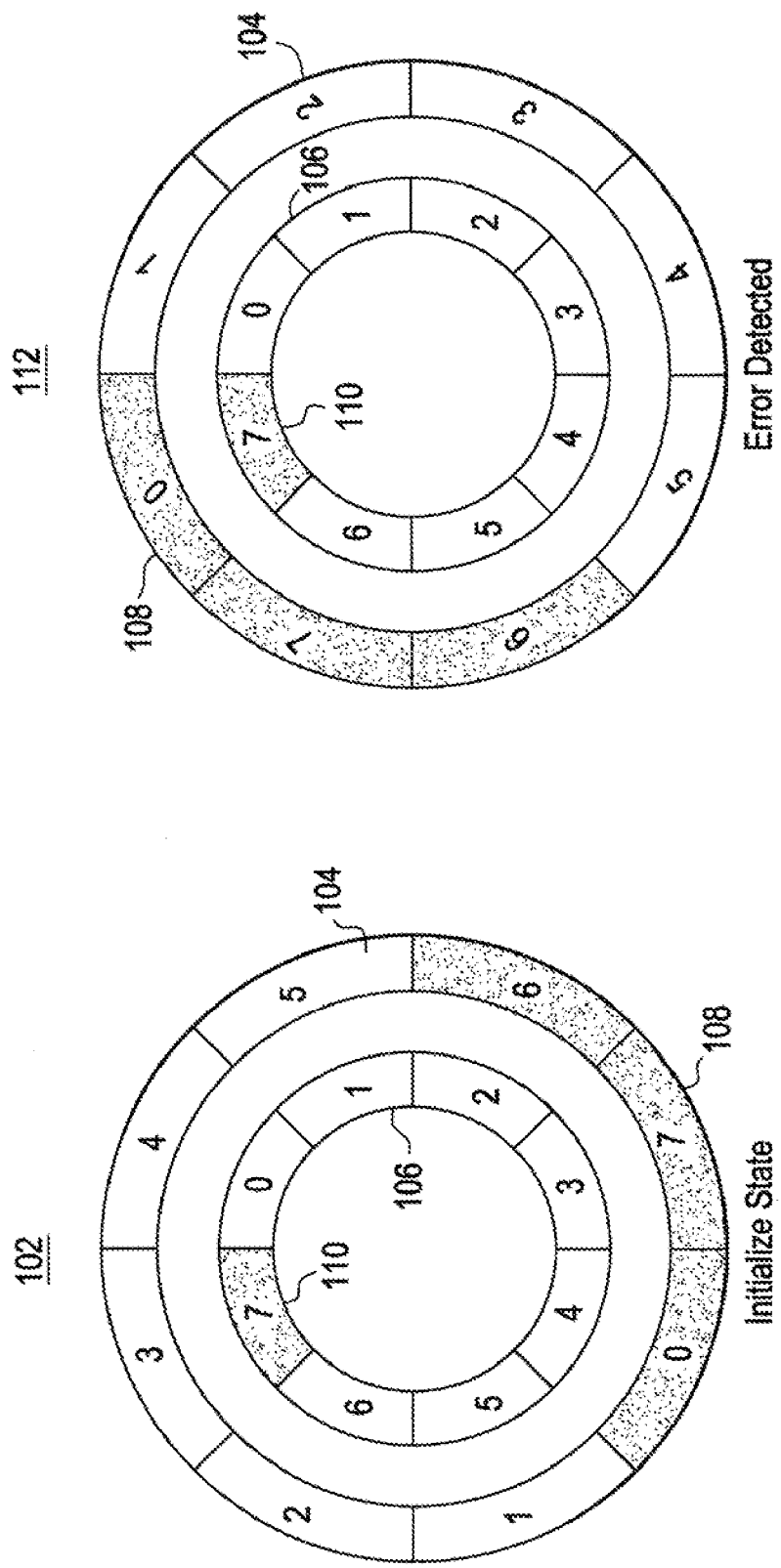
FIG. 3 is a schematic diagram of error detection system for a FIFO memory in accordance with one embodiment of the invention.

The operation of the error circuit can be more easily understood with reference to FIG. 3. FIG. 3 is a schematic diagram of error detection system for a FIFO memory in accordance with one embodiment of the invention. Shown on the left is the initial state 102 of the write pointer 104 and the read pointer 106. The write pointer output 104 is set to be a logic high 108 for three write clock cycles shown in gray. Specifically, the write pointer output is set to be high when writing the zero, sixth and seventh bit is written in a cycle. Note that the example assumes an eight location FIFO memory. The read pointer output 106 is set high for one read clock cycle 110 shown in gray each FIFO memory cycle. When the read and write clock run at different speeds, the two rings will rotate with respect to each other. An error condition happens when gray or high states 108, 110 overlap as shown in the error detected state 112 shown at the left side of FIG. 3. The goal of the error detection scheme is to not allow any undetected data corruption and no errors should be indicated when the clocks remain within their specified limits. Since the allowed rate of phase change for the write clock is slow, this allows detection of an error to be detected by an overlap of the FIFO pointers read pointer and write pointer once per FIFO memory cycle. In the communication systems, the read clock and the write clock operate at almost identical frequency and experience only short-term variations from each other. The cumulative phase difference between read and write clock due to these short-term frequency variations should not exceed one read clock cycle (360 degrees) during one FIFO memory cycle. The overlap of the pointers is detected by setting one pulse of the pointers (read or write) to at least three clock cycles, while having the other pointer to be high for at least one clock cycle long, in one embodiment. In another embodiment the read and write data, instead of read and write pointers, are used to generate the signals for comparison by error detection circuit once every FIFO memory cycle. Note that this assumes the frequency change between read and write clocks is limited as explained earlier. Note that if the pointers can only approach from one direction then the longer pointer can be high for only two clock cycles. Also note that the pointers may be set to be high for longer than the number of clock cycles described herein as the minimum number has been described. The read output is initiated true near a start of the read cycle. The write output is initiated true near a middle of the write cycle. The read and write pointers are initiated at a maximum distance from each other. In one embodiment, the read pointer is initiated near the start of FIFO memory location count and the write pointer is initiated near the middle of FIFO memory location count. This makes the pointers as far out of phase as possible for the initial state.

The read pointer and write pointer are commonly implemented as counters. As a result, it is simple to have an output that is high from the counter that is one, two, three or more clock cycles long by just selecting the right tap from the counter.

FIG. 4 is a timing diagram 120 of a FIFO memory and error circuit in accordance with one embodiment of the invention. The top trace 122 is the read clock. The next trace 124 is the write clock. The next trace 126 sets the buffer depth to thirty two in this case. The next trace 128 is an goes high if the system receives a pre-determined alignment sequence to regain or keep the channels aligned. The next trace 130 is align status signal and goes high if a pre-determined number of alignment sequences are detected after a system error. The next trace 132 is the write data. The next trace 134 is the read trace data. The next trace 136 is the error signal. Note that an error has been detected 138. The next trace 140 is the write clock pointer. The next trace 142 is the stored write pointer location to record when the last alignment sequence was received. The next trace 144 is the write pointer output, which is shown high for three clock cycles 146. The next trace 148 is the read clock pointer. The last trace 150 is the read pointer output which is shown high for one clock pulse 152, 154. Note that the writer pointer output 146 is high at the same time as the read pointer output 152 which results in an error being detected 138.

Thus there has been described a First-In First-Out (FIFO) memory error detection scheme that uses the writer pointer count and the read counter pointer to determine if the write pointer and the read pointer are within one clock cycle. This may be implemented by having a high output once every cycle for both pointers. One of the pointers will be high two or three clock cycles while the other pointer is high for a single clock cycle. The outputs of the pointers are combined in an AND gate and when both are high at the same time an error has occurred. This First-In First-Out (FIFO) memory error detection scheme requires very few gates to implement and therefore uses very little die space. The scheme is simpler and less expensive to implement than previous designs While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A FIFO memory error circuit, comprising:
a read pointer control logic coupled to a FIFO memory having a read output that is true once every read cycle of the FIFO memory, wherein a read pulse width of the true output of the read pointer control logic is not less than two read clock cycles and a write pulse width of the true output of the write pointer control logic is at least one write clock cycle;
a write pointer control logic coupled to a FIFO memory having a write output that is true once every write cycle of the FIFO memory; and
an error detection circuit having a first input coupled to the read output and a second input coupled to the write output.

2. The circuit of claim 1 wherein a write pulse width of the true output of the write pointer control logic is not less than two write clock cycles and a read pulse width of the true output of the read pointer control logic is at least one read clock cycle.

3. The circuit of claim 1, wherein the error detection circuit includes an AND gate having the first input coupled to the read output and the second input coupled to the write output, an output of the AND gate coupled to the input of a latch.

4. The circuit of claim 3, wherein the latch is clocked by a read clock.

5. The circuit of claim 1, wherein the read pointer is initiated true near a start of the read cycle.

6. The circuit of claim 1, wherein the write pointer is initiated true near a middle of the write cycle.

7. A method of determining a FIFO memory error, comprising the steps of:
a) determining a read pointer count in a FIFO memory:
b) determining a write pointer count in the FIFO memory; and
c) determining if the read pointer count is within a clock cycle of the write pointer count.

8. The method of claim 7, further including the step of:
d) when the read pointer count is within the clock cycle of the write pointer count, generating an error signal.

9. The method of claim 7, wherein step (c) further includes the step of:
c1) determining if the read pointer count is within a read clock cycle of the write pointer count.

10. The method of claim 7, wherein step (c) further includes the step of:
c1) determining if the read pointer count is within a write clock cycle of the write pointer count.

11. The method of claim 7, wherein step (a) further includes the step of:
a1) setting a read pointer to a true read state for a predetermined number of read clock cycles one ever FIFO memory cycle.

12. The method of claim 11, wherein step (b) further includes the step of:
b1) setting a write pointer to a true write state for a predetermined number of write cycles once every FIFO memory cycle.

13. The method of claim 12, wherein step (c) further includes the step of:
c1) determining if the true read state overlaps the true write state.

14. A FIFO memory error circuit, comprising:
a read pointer coupled to a FIFO memory having a logic high output once every FIFO memory cycle;
a write pointer coupled to the FIFO memory having a logic high output once every FIFO memory cycle; and
an error detector having a first input coupled to the read pointer and a second input coupled to the write pointer.

15. The circuit of claim 14, where the read pointer has the logic high output for a predetermined number of read clock cycles.

16. The circuit of claim 15, wherein the write pointer has the logic high output for a predetermined number of write cycles.

17. The circuit of claim 16, wherein the error detector has a logic high output when the read pointer has the logic high output at the same time as the write pointer has a logic high state.

18. The circuit of claim 16, wherein the predetermined number of write clock cycles is at least one.

19. The circuit of claim 18, wherein the predetermined number of read clock cycles is at least two.

* * * * *